United States Patent
Matus et al.

(10) Patent No.: US 9,955,319 B2
(45) Date of Patent: Apr. 24, 2018

(54) METHOD FOR MOBILE DEVICE-BASED COOPERATIVE DATA CAPTURE

(71) Applicant: Zendrive, Inc., San Francisco, CA (US)

(72) Inventors: Jonathan Matus, San Francisco, CA (US); Pankaj Risbood, San Francisco, CA (US); Aditya Karnik, San Francisco, CA (US); Manish Sachdev, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 15/702,601

(22) Filed: Sep. 12, 2017

(65) Prior Publication Data
US 2018/0077538 A1    Mar. 15, 2018

Related U.S. Application Data

(60) Provisional application No. 62/393,308, filed on Sep. 12, 2016.

(51) Int. Cl.
*B60R 21/0132*    (2006.01)
*H04W 4/04*    (2009.01)
(Continued)

(52) U.S. Cl.
CPC ......... *H04W 4/046* (2013.01); *B60R 21/0132* (2013.01); *G08G 1/162* (2013.01);
(Continued)

(58) Field of Classification Search
CPC .. H04W 4/046; H04W 4/203; B60R 21/0132; B60R 2021/0027; B60R 2021/01013; G08G 1/162
See application file for complete search history.

(56) References Cited

U.S. PATENT DOCUMENTS 5,673,039 A    9/1997 Pietzsch et al.
6,055,477 A    4/2000 McBurney et al.
(Continued)

OTHER PUBLICATIONS

T. Das, P. Mohan, V. Padmanabhan, R. Ramjee and A. Sharma, "PRISM: Platform for Remote Sensing using Smartphones," In. Proc. Mobisys '10, Jun. 15-18, 2010, San Fransisco, USA, pp. 63-76.*

*Primary Examiner* — Thomas G Black
*Assistant Examiner* — Peter D Nolan
(74) *Attorney, Agent, or Firm* — Jeffrey Schox

(57) ABSTRACT

Embodiments of a method for improving movement characteristic determination using a plurality of mobile devices associated with a vehicle can include: collecting a first movement dataset corresponding to at least one of a first location sensor and a first motion sensor of a first mobile device of the plurality of mobile devices; collecting a second movement dataset corresponding to at least one of a second location sensor and a second motion sensor of a second mobile device of the plurality of mobile devices; determining satisfaction of a device association condition indicative of the first and the second mobile devices as associated with the vehicle, based on the first and the second movement datasets; and after determining the satisfaction of the device association condition, determining a vehicle movement characteristic based on the first and the second movement datasets.

18 Claims, 6 Drawing Sheets

(51) Int. Cl.
*G08G 1/16* (2006.01)
*H04W 4/02* (2018.01)
*B60R 21/00* (2006.01)
*B60R 21/01* (2006.01)

(52) U.S. Cl.
CPC ............. *B60R 2021/0027* (2013.01); *B60R 2021/01013* (2013.01); *H04W 4/023* (2013.01)

(56) References Cited

U.S. PATENT DOCUMENTS

| | | |
|---|---|---|
| 6,826,477 B2 | 11/2004 | Ladetto et al. |
| 6,941,222 B2 | 9/2005 | Yano et al. |
| 7,532,196 B2 | 5/2009 | Hinckley |
| 7,668,931 B2 | 2/2010 | Parupudi et al. |
| 8,054,168 B2 | 11/2011 | McCormick et al. |
| 8,326,257 B2 | 12/2012 | Shiu et al. |
| 8,352,189 B2 | 1/2013 | Scott et al. |
| 8,369,876 B2 | 2/2013 | Bachmann et al. |
| 8,395,542 B2 | 3/2013 | Scherzinger et al. |
| 8,498,610 B2 | 7/2013 | Staehlin Ulrich |
| 8,521,193 B2 | 8/2013 | Paek et al. |
| 8,577,703 B2 | 11/2013 | McClellan et al. |
| 8,634,822 B2 | 1/2014 | Silver et al. |
| 8,754,766 B2 | 6/2014 | Oesterling et al. |
| 8,971,927 B2 | 3/2015 | Zhou et al. |
| 8,972,103 B2 | 3/2015 | Elwart et al. |
| 9,064,412 B2 | 6/2015 | Baur |
| 9,121,940 B2 | 9/2015 | Psiaki et al. |
| 9,185,526 B2 | 11/2015 | Guba et al. |
| 9,188,451 B2 | 11/2015 | Magnusson et al. |
| 9,221,428 B2 | 12/2015 | Kote et al. |
| 9,222,798 B2 | 12/2015 | Curtis et al. |
| 9,250,090 B2 | 2/2016 | Hille et al. |
| 9,311,271 B2 * | 4/2016 | Wright ................ G07C 5/008 |
| 9,360,323 B2 | 6/2016 | Grokop |
| 9,390,625 B2 | 7/2016 | Green et al. |
| 9,558,520 B2 | 1/2017 | Peak et al. |
| 9,566,981 B2 | 2/2017 | Rebhan et al. |
| 9,633,487 B2 * | 4/2017 | Wright ................ G07C 5/008 |
| 9,645,970 B2 | 5/2017 | Boesch et al. |
| 9,674,370 B2 * | 6/2017 | Kim .................. H04M 11/04 |
| 9,689,698 B2 | 6/2017 | Wesselius et al. |
| 9,773,281 B1 * | 9/2017 | Hanson ............... G06Q 40/08 |
| 9,794,729 B2 * | 10/2017 | Meyers ............... H04W 4/005 |
| 9,801,027 B2 * | 10/2017 | Levy .................. G08G 1/0112 |
| 9,818,239 B2 | 11/2017 | Pal et al. |
| 2007/0005228 A1 | 1/2007 | Sutardja |
| 2007/0208501 A1 | 9/2007 | Downs et al. |
| 2010/0299021 A1 | 11/2010 | Jalili |
| 2011/0077028 A1 | 3/2011 | Wilkes, III et al. |
| 2012/0197587 A1 * | 8/2012 | Luk ..................... B60W 40/09 702/141 |
| 2013/0041521 A1 | 2/2013 | Basir et al. |
| 2013/0069802 A1 | 3/2013 | Foghel et al. |
| 2013/0211618 A1 | 8/2013 | Iachini |
| 2013/0302758 A1 * | 11/2013 | Wright ................ G07C 5/008 434/65 |
| 2014/0188638 A1 * | 7/2014 | Jones ............... H04M 1/72569 705/16 |
| 2015/0025917 A1 * | 1/2015 | Stempora ............ G06Q 40/08 705/4 |
| 2015/0084757 A1 | 3/2015 | Annibale et al. |
| 2016/0033366 A1 * | 2/2016 | Liu .................... G01M 17/007 701/33.2 |
| 2016/0042767 A1 * | 2/2016 | Araya ................. G11L 319/02 386/201 |
| 2016/0048399 A1 * | 2/2016 | Shaw .................... G01D 1/18 718/1 |
| 2016/0174049 A1 * | 6/2016 | Levy .................. G08G 1/0112 455/456.5 |
| 2016/0189442 A1 * | 6/2016 | Wright ................ G07C 5/008 701/33.2 |
| 2016/0272140 A1 * | 9/2016 | Kim .................. H04M 11/04 |
| 2016/0325756 A1 * | 11/2016 | Cordova ............. G01C 21/16 |
| 2016/0328893 A1 * | 11/2016 | Cordova ............... G06N 7/005 |
| 2016/0381505 A1 * | 12/2016 | Sankaran .......... H04M 1/7253 455/418 |
| 2017/0103342 A1 * | 4/2017 | Rajani ............... G06N 99/005 |
| 2017/0103588 A1 * | 4/2017 | Rajani ............... G06N 99/005 |
| 2017/0115125 A1 * | 4/2017 | Outwater ............ G08G 1/005 |
| 2017/0138737 A1 * | 5/2017 | Cordova ............ G01C 21/165 |
| 2017/0164158 A1 * | 6/2017 | Watkins .............. H04W 4/027 |
| 2017/0178416 A1 * | 6/2017 | Barreira Avegliano .......... G07B 15/06 |
| 2017/0178422 A1 * | 6/2017 | Wright .................. G07C 5/02 |
| 2017/0178424 A1 * | 6/2017 | Wright .................. G07C 5/02 |
| 2017/0210323 A1 * | 7/2017 | Cordova ........... B60R 21/01558 |
| 2017/0211939 A1 * | 7/2017 | Cordova ............. G01C 21/16 |
| 2017/0279947 A1 * | 9/2017 | Rajakarunanayake ............. H04M 1/6091 |

\* cited by examiner

METHOD FOR MOBILE DEVICE-BASED COOPERATIVE DATA CAPTURE

CROSS-REFERENCE TO RELATED APPLICATIONS

This application claims the benefit of U.S. Provisional Application Ser. No. 62/393,308, filed on 12 Sep. 2016, which is incorporated in its entirety by this reference.

TECHNICAL FIELD

This invention relates generally to the vehicle telematics field, and more specifically to a new and useful method for mobile device-based cooperative data capture and processing in the vehicle telematics field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
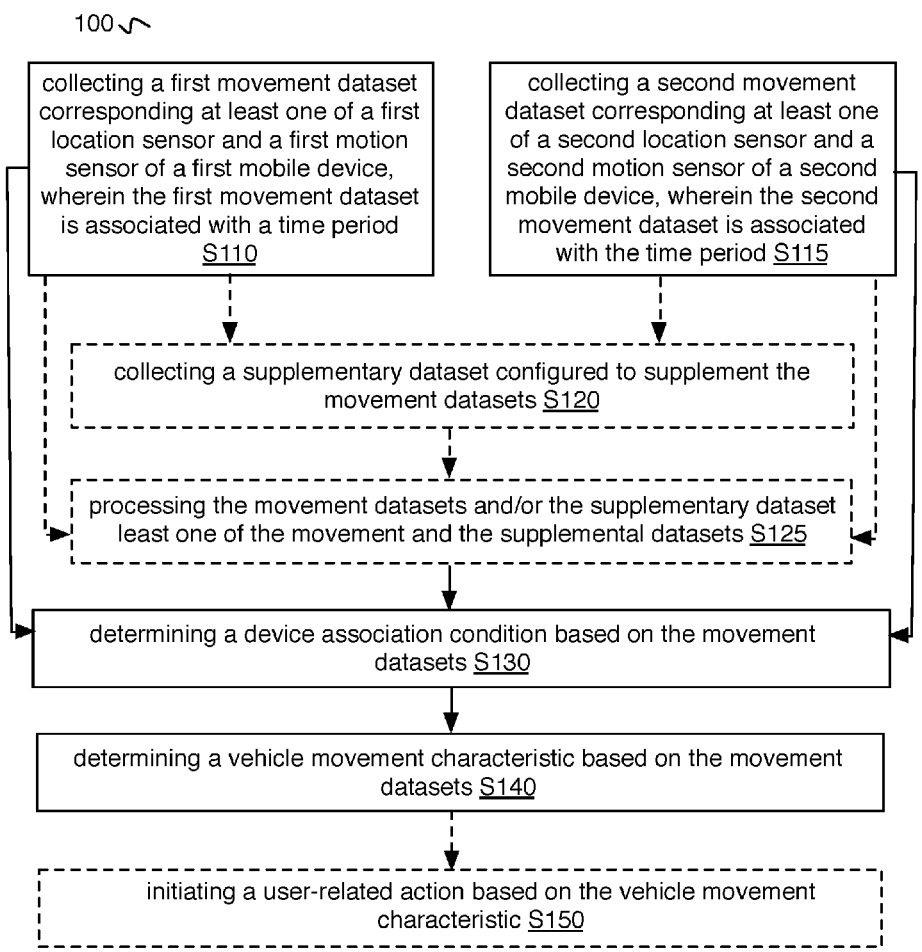
FIG. 1 is a schematic representation of variations of an embodiment of a method for improving movement characteristic determination.
Figure 2:
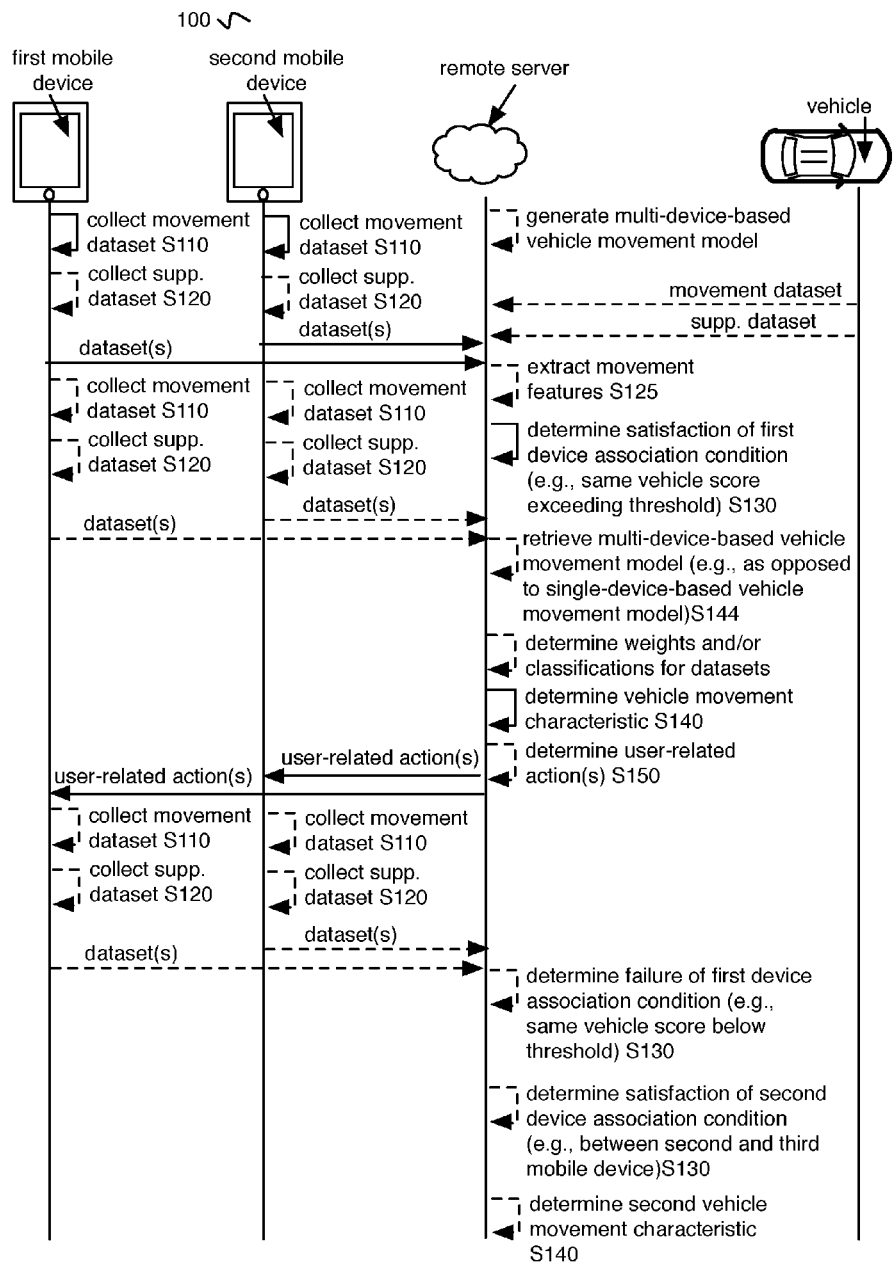
FIG. 2 is a schematic representation of an embodiment of a method for improving movement characteristic determination.
Figure 3:
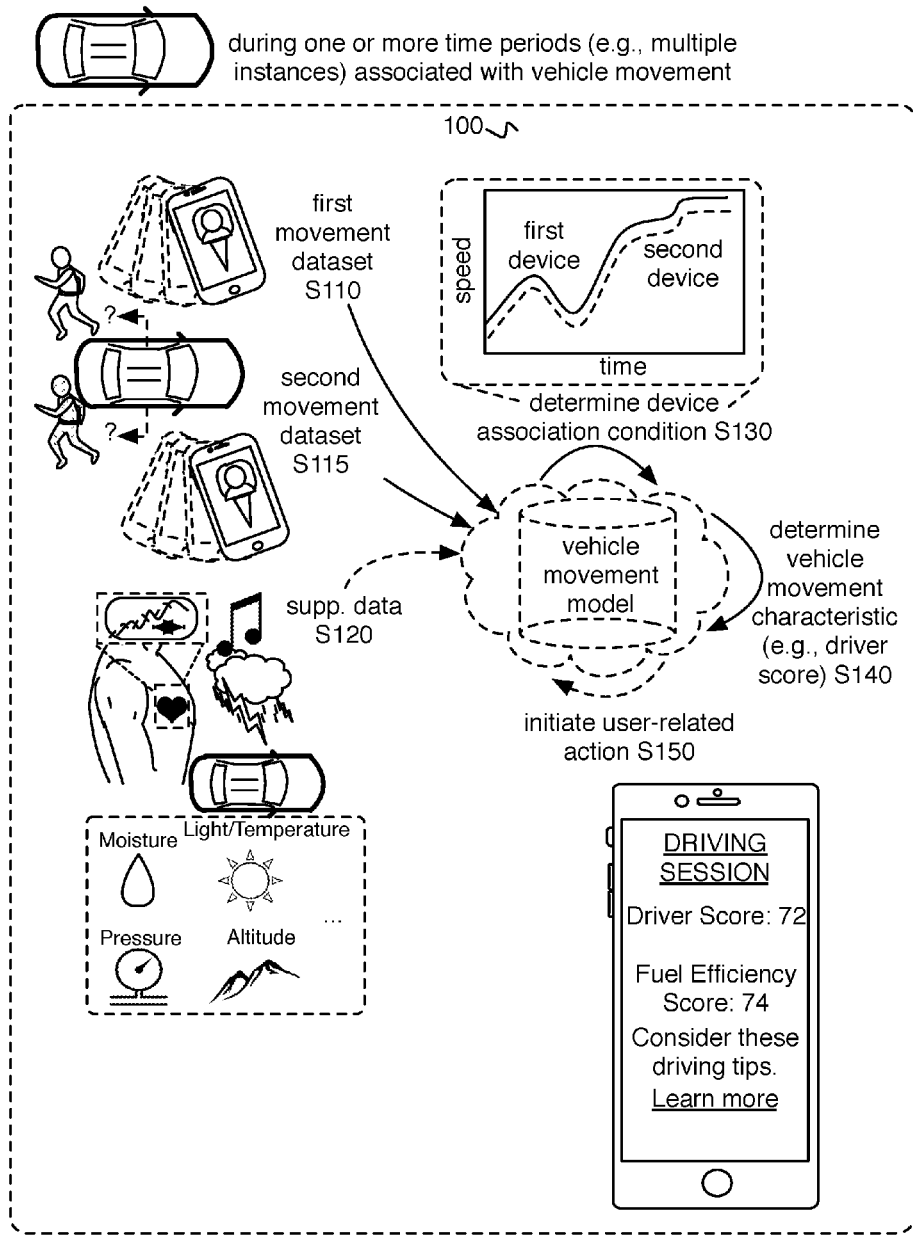
FIG. 3 is a schematic representation of an embodiment of a method for improving movement characteristic determination.

As shown in FIGS. 1-3, embodiments of a method 100 for improving vehicle movement characteristic determination using a plurality of mobile devices associated with a vehicle (e.g., residing within the vehicle) can include: collecting a first movement dataset corresponding to at least one of a first location sensor and a first motion sensor of a first mobile device of the plurality of mobile devices, where the first movement dataset is associated with a time period S110; collecting a second movement dataset corresponding to at least one of a second location sensor and a second motion sensor of a second mobile device of the plurality of mobile devices, where the second movement dataset is associated with the time period S115; determining satisfaction of a device association condition indicative of the first and the second mobile devices as associated with the vehicle, based on the first and the second movement datasets S130; and after determining the satisfaction of the device association condition, determining a vehicle movement characteristic based on the first and the second movement datasets, where the vehicle movement characteristic describes movement of the vehicle S140. Additionally or alternatively, embodiments of the method 100 can include: collecting a supplementary dataset associated with the time period S120; processing the movement datasets and/or the supplementary dataset S125; and initiating a user-related action based on the vehicle movement characteristic S150; and/or any other suitable processes.

Embodiments of the method 100 and/or system 200 can function to collect and process movement data (and/or supplementary data) from a plurality of mobile devices to improve determination of vehicle movement characteristics associated with vehicle movement (e.g., associated with position, velocity, and/or acceleration of the vehicle; vehicular accident events; driver scores describing driving ability; driver and/or passenger classification; etc.). In specific examples, improving determination of vehicle movement characteristics can be based on dividing tasks among the multiple mobile devices (e.g., to reduce load on an individual device or to take advantage of distinct capabilities of multiple devices); by performing data processing using data sources from multiple devices (e.g., combining location estimates of two mobile devices in a vehicle to produce a more accurate location estimate of the vehicle); and/or through other suitable distributions of functionality across a plurality of devices.

In a specific example, the method 100 can include: detecting a first mobile device as traveling within a vehicle operating in a driving session (e.g., based on motion data and/or other sensor data matching patterns associated with vehicular driving sessions); detecting a second mobile device as traveling within a vehicle operating in a driving session (e.g., based on the second mobile device's motion data and/or other sensor matching the vehicular driving session patterns; etc.); collecting a supplementary dataset informative of the first and the second mobile devices (e.g., historical driving sessions for the first and the second mobile devices; previously determined device association conditions between the first and the second mobile devices); determining a device association condition between the first and the second mobile devices (e.g., that the mobile devices are positioned within the same vehicle) based on the supplementary dataset and the detection of the first and the second mobile devices as associated with vehicular travel; determining a vehicle movement characteristic (e.g., a PVA characteristic for the vehicle) based on movement datasets from the first and the second mobile devices (e.g., for each movement dataset, mapping the sensor values in the movement datasets to individual PVA characteristics, and averaging the individual PVA characteristics to generate an overall PVA characteristic); and initiating a user-related action based on the vehicle movement characteristic (e.g., calculating a driver score evaluating the safety measures taken by the driver of the vehicle based on the overall PVA characteristic, etc.).

Figure 6:
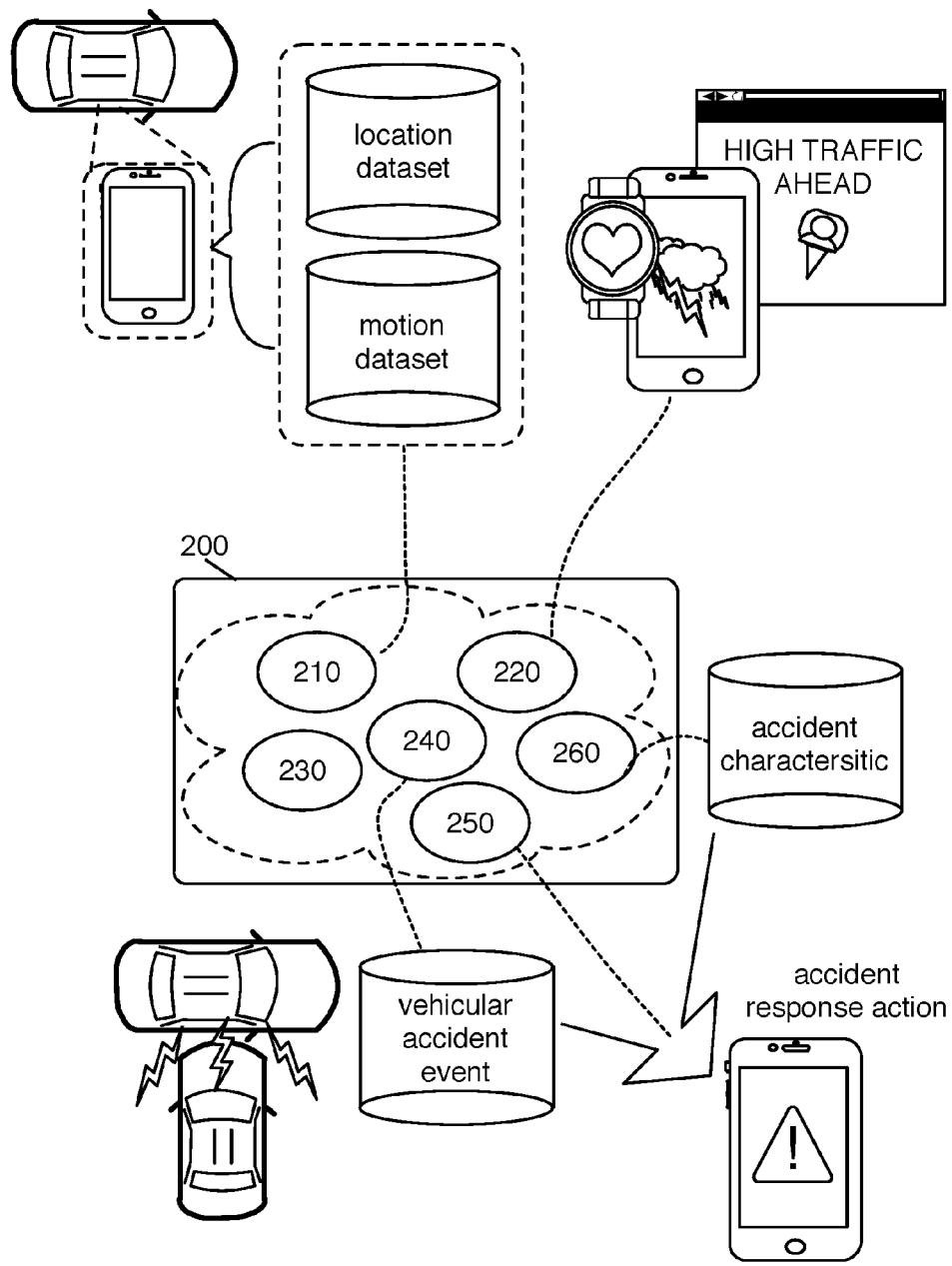
FIG. 6 illustrates an embodiment of the system.

The method 100 is preferably implemented using a plurality of mobile devices (e.g., smartphones, laptops, tablets, smart watches, smart glasses, virtual reality devices, augmented reality devices, aerial devices such as drones, medical devices, etc.) removably coupled to one or more vehicles (e.g., motor vehicles, bicycles, watercraft, aircraft, spacecraft, railed vehicles, autonomous vehicles, etc.). In variations, the method 100 can be implements with any components of a system 200 described in and/or analogous to U.S. application Ser. No. 15/584,375 filed 2 May 2017, which is herein incorporated in its entirety by this reference. As shown in FIG. 6, an embodiment of a system 200 for detecting a vehicular accident includes a processing system 205 including: a first module 210 configured to receive a movement dataset collected during a time period of vehicle movement; a second module 220 configured to receive a supplemental dataset during the time period; a third module 230 configured to extract a set of movement features associated with at least one of a position, a velocity, and an acceleration characterizing the movement of the vehicle during the time period; a fourth module 240 configured to detect a vehicular accident event from processing the set of movement features with an accident detection model; and a fifth module 250 configured to automatically initiate an accident response action in response to detecting the vehicular accident event. Additionally or alternatively, the system can include a sixth module 260 configured to determine an accident characteristic, and/or a seventh module configured to receive accident detection feedback. Additionally or alternatively, the method 100 can be implemented by any number of suitable devices (e.g., including the one or more vehicles themselves, such as with processing systems, communication systems, and/or other suitable systems of the vehicles; remote computing systems; local computing systems; etc.); and/or any other suitable components.

One or more instances of the method 100 and/or processes described herein can be performed asynchronously (e.g., sequentially), concurrently (e.g., in parallel; concurrently on different threads for parallel computing to improve system processing ability for determining device association conditions, and/or other suitable data; etc.), in temporal relation to a trigger event, and/or in any other suitable order at any suitable time and frequency by and/or using one or more instances of the system 200, elements, and/or entities described herein. Additionally or alternatively, data described herein (e.g., movement data, vehicle movement characteristics, etc.) can be associated with any suitable temporal indicators (e.g., seconds, minutes, hours, days, weeks, etc.; temporal indicators indicating when the data was collected, determined and/or otherwise processed; temporal indicators providing context to content described by the data, such as temporal indicators indicating the time at which a vehicle exhibited the vehicle movement characteristics associated with the temporal indicators; etc.) and/or change in temporal indicators (e.g., data over time; change in data; data patterns; data trends; data extrapolation and/or other prediction; etc.). However, the method 100 and/or system 200 can be configured in any suitable manner.

2. Benefits.

In specific examples, the method 100 and/or system 200 can confer several benefits over conventional methodologies. In specific examples, the method 100 and/or system 200 can perform one or more of the following:

First, the technology can confer improvements in computer-related technology (e.g., vehicle telematics, computational modeling associated with vehicle movement characteristics, etc.) by leveraging non-generic location data (e.g., GPS data), motion data (e.g., accelerometer data, gyroscope data), and/or other suitable data from a plurality of mobile devices (e.g., non-generalized mobile devices) to improve accuracy of determining device association conditions (e.g., detecting the presence of a plurality of mobile devices residing in the same vehicle, etc.) and/or vehicle movement characteristics (e.g., which can thereby enable appropriately generated and/or timed user-related actions). In examples, the technology can confer improvements in the application of such technology by enabling convenient and unobtrusive vehicle movement characteristic determination through passively collected location data and/or motion data at a plurality of users' mobile devices (e.g., multiple smartphones residing in the same vehicle, etc.). As such, that the technology can be applied, in examples, without requiring a user to purchase additional hardware.

Second, the technology can automatically initiate user-related actions based on the vehicle movement characteristics of improved accuracy (e.g., which can be determined in substantially real-time). For example, vehicular accident response actions can be initiated, such as at a plurality of devices (e.g., contacting different emergency contacts; etc.), in response to detection of a vehicular accident. In another example, driving guidance (e.g., to improve safety, fuel efficiency, etc.) can be provided in real-time to the driver at a driver mobile device (e.g., classified as associated with the driver based on data collected from a plurality of mobile devices, etc.) based on the vehicle movement characteristics. In another example, improved insurance processing can be facilitated by the improved accuracy of vehicle movement characteristics describing the movement of the vehicle and/or other vehicles.

Third, the technology can provide technical solutions necessarily rooted in computer technology (e.g., determining device association conditions describing mobile device associations with a moving vehicle based on the mobile device data; utilizing different computational models to determine vehicle movement characteristics based on the results from determining the device association conditions; etc.) to overcome issues specifically arising with computer technology (e.g., issues surrounding how to leverage a plurality of movement data collected by a plurality of mobile devices; issues surrounding accurately and appropriately initiating user-related actions for different vehicular situations; etc.). In another example, the technology can apply computer-implemented rules (e.g., feature engineering rules for processing movement data and/or supplementary data into an operable form for generating features; user preference rules for determining the types of movement data and/or supplementary data that are permitted to be collected; data collection and/or processing rules for data from a plurality of mobile devices; etc.).

Fourth, the technology can confer improvements in the functioning of computational systems themselves. For example, the technology can improve upon the processing of collected non-generic data (e.g., stored in association with personalized user accounts as a cohesive database system) by improving storage and retrieval of different models tailored for device association condition determination and/or vehicle movement characteristic determination (e.g., selecting and retrieving a multi-device-based vehicle movement model S144 or a single-device-based vehicle movement based on results of the device association condition determination, etc.)

Fifth, the technology can amount to an inventive distribution of functionality across a network including a plurality of mobile devices associated with a moving vehicle, and a vehicle movement determination system (e.g., a remote computing system, etc.), where, for example, movement data collection functionality can be performed by the plurality of mobile devices, and determination of device association conditions, vehicle movement characteristics, and/or other data can be determined by the vehicle movement determination system. In examples, functionality associated with portions of the method 100 can be distributed in any suitable manner (e.g., where one or more mobile devices of the plurality of mobile devices can determine device association conditions, vehicle movement characteristics, user-related actions, etc.).

Sixth, the technology can leverage specialized computing devices (e.g., a network of mobile devices with GPS location capabilities; mobile devices with motion sensor functionality, etc.) to collect specialized datasets for subsequent processing. The technology can, however, provide any other suitable benefit(s) in the context of using non-generalized computer systems for determining, using, and/or otherwise processing vehicle movement characteristics.

3.1 Collecting a Movement Dataset.

Block S110 recites: collecting a first movement dataset corresponding to at least one of a first location sensor and a first motion sensor of a first mobile device of the plurality of mobile devices, where the first movement dataset is associated with a time period S110. Block S110 can function to collect movement-related data from a first mobile device associated with a vehicle (e.g., currently residing in the vehicle; historically residing in the vehicle; moving in a manner tracking the vehicular movement; paired with the vehicle; in communication with the vehicle; etc.) for use in characterizing mobile devices (e.g., in relation to a device association condition), vehicles (e.g., in relation to a vehicle movement characteristic), users (e.g., in relation to a driver score, to a classification as driver or passenger, etc.), and/or other suitable entities.

Movement datasets preferably describe at least one of position, velocity, and/or acceleration (PVA) of one or more vehicles, user devices (e.g., user smartphones), users, and/or any other suitable entities, but can additionally or alternatively describe any suitable movement-related characteristic. Movement datasets are preferably sampled at one or more movement sensors indicative of one or more of motion and/or location, which can include one or more of: motion sensors (e.g., multi-axis and/or single-axis accelerometers, gyroscopes, etc.), location sensors (e.g., GPS data collection components, magnetometer, compass, altimeter, etc.), optical sensors, audio sensors, electromagnetic (EM)-related sensors (e.g., radar, lidar, sonar, ultrasound, infrared radiation, magnetic positioning, etc.), environmental sensors (e.g., temperature sensors, altitude sensors, pressure sensors, etc.), biometric sensors, and/or any other suitable sensors.

In a variation, Block S110 can include deriving movement data from collected signal data (e.g., in relation to EM signals transmitted and/or received by mobile devices, vehicles, etc.), such as based on signal quality (e.g., in-vehicle WiFi signal quality; differences in cellular signal quality for mobile devices within a vehicle; Bluetooth signal quality between mobile devices in a vehicle, between mobile devices and a vehicle media system; etc.), received signal strength indicators, Wi-Fi positioning system parameters, signal angle of arrival (e.g., with directional sensors), and/or any other suitable signal-related data. In another variation, Block S110 can include deriving movement data from visual data (e.g., deriving PVA data from video taken by a smartphone's camera and/or vehicle camera; derived from visual markers captured in optical data, such as geographical markers, markers indicated by satellite imagery; etc.) and/or audio data (e.g., deriving motion from Doppler effects captured in data from the smartphone's microphone, etc.). In another variation, Block S110 can include collecting laser rangefinder data sampled using lasers associated with a vehicle. In another variation, Block S110 can include collecting movement data from data collected at the vehicle (e.g., vehicle sensors described herein and/or other suitable vehicle sensors), where the movement data can be received through wired communication (e.g., transmission of data from the vehicle to a mobile device through a wired communication channel, etc.) and/or wireless communication (e.g., transmission of data from the vehicle to a remote vehicle movement determination system through WiFi; transmission of data from the vehicle to the mobile device through Bluetooth, and transmission of the data from the mobile device to the remote vehicle movement determination system; etc.). Movement-related data collected from any suitable components (e.g., different types of mobile devices, etc.) can be processed together, individually, and/or in any suitable manner. However, movement data can be derived from any suitable components in any suitable manner.

Block S110 preferably includes collecting one or more location datasets, which can include any one or more of: GPS data (e.g., position coordinates, associated time stamps, etc.), indoor positioning system data, local positioning system data, multilateration data, GSM localization data, self-reported positioning, control plane locating data, compass data, magnetometer data, and/or any other suitable location-related data. In an example, GPS data can be leveraged for complete PVA solutions, but can additionally or alternatively include any movement data, such as retrieved using GNSS data (e.g., via GLONASS, Galileo, BeiDou). In another example, proximity sensors associated with mobile phones (e.g., for capacitive proximity sensing; IR-based proximity sensing; etc.) can be used to in determining location of objects (e.g., users within a vehicle). In another example, Block S110 can include collecting a micro-location dataset (e.g., sampled using beacons within and/or mounted to a vehicle). In another example, Block S110 can include collecting a location dataset sampled by a mobile device and indicating the location of the mobile device within the vehicle (e.g., proximal front of vehicle; back of vehicle; etc.). However, collecting location datasets can be performed in any suitable manner.

Block S110 preferably includes collecting one or more motion datasets, which can include one or more of: accelerometer data (e.g., single-axis data, multi-axis data), gyroscope data (e.g., single-axis data, multi-axis data), velocity data (e.g., speed, instantaneous velocity, average velocity, change in velocity, velocity variability over time, maximum velocity, minimum velocity, etc.), acceleration data (e.g., instantaneous acceleration, gravitational acceleration, average acceleration, change in acceleration, acceleration variability over time, maximum acceleration, minimum acceleration, etc.), displacement data, orientation data, rotation data, turning data, and/or any other suitable motion-related data. In an example, Block S110 can include collecting a motion dataset for a user entering or exiting a vehicle (e.g., where the motion dataset can be indicative of whether the user is a driver or passenger entering or exiting the vehicle from a driver seat door or passenger seat door; where the motion dataset indicates walking patterns of the user in relation to entering or exiting a vehicle; etc.). However, collecting motion datasets can be performed in any suitable manner.

In relation to Block S110, movement datasets (and/or supplementary datasets) are preferably sampled by components arranged at a mobile device, but can additionally or alternatively be sampled by components associated with (e.g., arranged at, positioned within, mounted to, physically connected to, etc.) any suitable device and/or vehicle. Movement datasets (and/or supplementary datasets) are preferably associated with one or more users (e.g., collected at a mobile device of the user; collected at a mobile device physically proximal a user; stored in association with user accounts for one or more users; movement datasets describing user movement, such as pre-, during-, and/or post-driving session; etc.). Further, movement datasets are preferably associated with one or more driving sessions, which can be characterized by characteristics and/or patterns in movement data (e.g., movement data indicating movement that is characteristic of a vehicle) and/or supplementary data (e.g., engine sounds as sensed by a smartphone microphone), and where driving sessions can include movement of, stoppage of, operation control related to, and/or other suitable aspects associated with vehicles. Additionally or alternatively, movement datasets can be associated or independent of any suitable entities.

Block S110 preferably includes collecting movement data continuously from mobile devices in a vehicle (e.g., during vehicle operation), such as in real-time, but can additionally or alternatively include collecting movement data periodically (e.g., at vehicle stoppage events, at predetermined time intervals such as every minute, etc.), and/or in temporal relation (e.g., in response to, etc.) to trigger conditions (e.g., movement-related thresholds; satisfaction or failure of device association conditions; conditions associated with supplementary data; etc.), but collecting movement datasets can be performed at any suitable time and/or frequency. Movement datasets are preferably associated with one or more temporal indicators (e.g., a time period, a time point, etc.) describing when the movement data was collected (e.g., sampled at the corresponding sensor, etc.), determined, and/or otherwise processed. Additionally or alternatively, associated temporal indicators can describe temporal context surrounding the movement indicated by the movement data (e.g., when the movement occurred) but can correspond to any suitable temporal indicator or be time-independent. However, collecting movement data S110 can be performed in any suitable manner.

3.2 Collecting an Additional Movement Dataset.

Block S115 recites: collecting a second movement dataset corresponding to at least one of a second location sensor and a second motion sensor of a second mobile device of the plurality of mobile devices, where the second movement dataset is associated with the time period S115. Block S110 functions to collect additional movement-related data from additional mobile devices, where multiple sources of movement-related data can be used, in examples, to reduce noise (e.g., through averaging data), improve data accuracy, fill gaps of movement data during a time period, manage subsequent data collection, increase confidence levels associated with determining vehicle movement characteristics and/or initiating user-related actions, and/or perform any suitable operation in relation to portions of the method 100.

In relation to Block S115, collecting additional movement datasets from additional mobile devices (e.g., from additional location sensors and/or motion sensors of the mobile devices, etc.) can be performed for any suitable number of additional mobile devices. The plurality of mobile devices associated with vehicles, users, and/or any other suitable entities can be associated in any suitable manner. In an example, a first mobile device can be associated with a driver (e.g., primarily managed by the driver; of closest physical proximity to the driver; physically coupled to the driver; physically mounted to the vehicle at a region proximal the driver; etc.), and additional mobile devices can be associated with one or more passengers (e.g., in an analogous manner as an association between driver and the first mobile device; etc.). Additionally or alternatively, multiple mobile devices can be associated with the same user (e.g., a driver smartphone residing in a pocket of the driver, a driver tablet mounted proximal the dashboard of the vehicle, a driver smartwatch worn at the wrist of the driver; etc.) In another example, different mobile devices of the plurality can be associated with different regions of the vehicle (e.g., a first mobile device physically proximal a driver seat, a second mobile device physically proximal a front passenger seat, a third mobile device physically proximal a back passenger seat, etc.). In another example, mobile devices of the plurality can reside outside of the vehicle (e.g., residing at a different, physically proximal vehicle; residing at a pedestrian; etc.).

Regarding Block S115, the second movement dataset and/or other additional movement datasets are preferably associated with a same, overlapping, and/or otherwise related temporal indicator (e.g., time period, etc.) as a temporal indicator associated with the first movement dataset. For example, the second movement dataset can be sampled during the same time period as the first movement dataset. Additionally or alternatively, movement datasets of a plurality of movement datasets can be associated with different temporal indicators. Collecting additional movement datasets can be performed at any suitable time and frequency (e.g., in temporal relation to trigger conditions). For example, collecting movement datasets can be initiated and or ceased pre-, during, and/or post-determination of device association conditions. In an example, the method 100 can include, after detecting satisfaction of a device association condition: receiving a first subsequent movement dataset corresponding to the at least one of the first location sensor and the first motion sensor of the first mobile device, where the first subsequent movement dataset is associated with a second time period (e.g., following a first time period associated with initial movement datasets); and receiving a second subsequent movement dataset corresponding to the at least one of the second location sensor and the second motion sensor of the second mobile device, where the second subsequent movement dataset is associated with the second time period. In a specific example, movement data collection at one or more mobile devices can be ceased in response to satisfaction of a device association condition (e.g., ceasing movement data at a second mobile device in response to determining that a first mobile device residing in the same vehicle is sufficiently collecting movement data; etc.). However, movement datasets can be temporally related or independent in any suitable manner.

Relating to Block S115, the second movement dataset and/or other additional movement datasets preferably include movement data of the same data types (e.g., each movement dataset including location data, motion data, etc.). For example, receiving a first movement dataset can include receiving (e.g., at the vehicle movement determination system, etc.) a first location dataset and a first motion dataset respectively corresponding to a first location sensor and a first motion sensor of a first mobile device; and receiving a second movement dataset can include receiving (e.g., at the vehicle movement determination system, etc.) a second location dataset and a second motion dataset respectively corresponding to a second location sensor and a second motion sensor. Additionally or alternatively, movement datasets can include data of different data types (e.g., the first movement dataset including location data, and the second movement dataset including motion data, vice versa, etc.). However, movement datasets can be otherwise similar to and/or different from each other. In variations, additional movement datasets and collecting additional movement datasets can be analogous to Block S110 and/or other portions of the method 100 in any suitable manner. However, Block S115 can be performed in any suitable manner.

3.3 Collecting a Supplementary Dataset.

The method 100 can additionally or alternatively include Block S120, which recites: collecting a supplementary dataset during a time period at one or more devices (e.g., mobile devices). Block S120 functions to collect data that can be used in combination with, to filter, to control for errors in, and/or otherwise supplement movement data. Additionally or alternatively, supplementary data can be used by portions of the method 100 in a manner independent of movement data (e.g., where supplementary data can be used to determine device association conditions without requiring movement data, etc.). In relation to Block S120, supplementary data can include any one or more of: user dataset (e.g., indicative of user information describing one or more characteristics of one or more users and/or associated devices, etc.), audio data (e.g., audio recorded by a plurality of mobile devices; audio associated with a phone call; associated with conversations involving one or more users in a vehicle, which can indicate the number of users present in a vehicle; including content informative of one or more user characteristics, such as driver behavior in response to a traffic-heavy route; environmental audio; vehicular audio, such as engine audio; etc.), optical data (e.g., optical datasets capturing the same object across different optical data from different mobile devices; imagery; video; internal vehicle-facing optical data of users and/or corresponding locations within a vehicle, such as optical data capturing a plurality of mobile devices and/or users within the vehicle; external vehicle-facing optical data of route, landmarks, geographical markers; optical data capturing users entering or exiting the vehicle, such as from the driver side or passenger side; mobile device camera data; etc.), vehicle data (e.g., vehicle proximity sensor data; OBD data; vehicle operation data; vehicle camera data; PVA data; fuel data; motion sensor data; etc.), traffic data (e.g., route data, which can be compared for different mobile devices for determining device association conditions; type of vehicular path such as freeway road or local road, which can be correlated with user driving preferences; accident data; traffic level; traffic laws; etc.), biometric data (e.g., cardiovascular parameters, such as heart rate, which can be indicative of user driving behavior in response to different traffic conditions; sleep metrics; respiration data; biological fluid data; etc.), environmental data (e.g., weather conditions, which can be correlated with frequency of a particular user to operate a vehicle during such weather conditions; road conditions; pressure conditions; air quality; etc.), and/or any other suitable data for facilitating determination of device association conditions, vehicle movement characteristics, and/or other suitable data.

Relating to Block S120, user datasets can include any one or more of: device datasets (e.g., describing devices associated with the user; describing additional devices associated with a current device, where such associations can indicate device association conditions; historical pairings and/or communications with other devices, such as vehicles and/or other user devices; etc.); behavioral datasets (e.g., driving behavior-related data upon which driving behavior profiles can be generated for users and/or user accounts; social media datasets derived from social media actions taken by the user and/or related to the user, which can indicate associations between users and/or corresponding devices; physical activity datasets associated with movement patterns of the user; etc.); demographic datasets (e.g., nationality, ethnicity, age, gender, etc.); device event datasets (e.g., associated with text messaging; phone calling; device idling; device charging; application usage; sensor usage; intelligent personal assistants; outputs such as media casting; inputs; etc.), and/or any other suitable datasets associated with a user. Vehicle data can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), car speed, RPM data, odometer, altimeter, location sensor data (e.g., GPS data, compass data, etc.), motion sensor data (e.g., from an accelerometer, gyroscope, etc.), environmental data (e.g., pressure, temperature, etc.), light sensor data (e.g., from infrared sensors, ambient light sensors, etc.), fuel level (e.g., percentile-based, distance-based, low warning, etc.), fuel system status, oxygen sensor data, throttle position, gear data (e.g., drive, neutral, park, reverse, gear number, etc.), HVAC data (e.g., current temperature, target temperature, etc.), driving status (e.g., restricted features such as user inputs into control panel, unrestricted features, etc.), and/or any other suitable vehicle data. For example, vehicle data can be used in comparisons with mobile device-derived movement data in training, updating, and/or otherwise processing computational models described herein and/or other suitable models. However, supplementary data types can be configured in any suitable manner.

Block S120 preferably includes collecting supplementary data at devices used in collecting movement data (e.g., user smartphone, etc.), but can additionally or alternatively include collecting supplementary data at a distinct device (e.g., other mobile device, medical device, other user device, third party database, etc.). For example, Block S120 can include collecting device event data (e.g., application usage, locks, unlocks, etc.) from a mobile device during a time period in which movement data from the mobile device is being collected. In another example, Block S120 can include collecting first supplementary data of a first type (e.g., device event data) from a first mobile device (e.g., where the corresponding user has permitted such data collection, etc.) during a time period; and collecting second supplementary data of a second type (e.g., audio data, etc.) from a second mobile device during the time period. However, collecting supplementary data can be performed at any suitable components associated with any suitable portions of the method 100.

Block S120 preferably includes passively collecting supplementary data (e.g., without requiring human intervention), but can additionally or alternatively include actively collecting supplementary data (e.g., from presenting a digital survey to the user at the mobile device, such as a digital survey inquiring as to whether there are additional mobile devices present in the vehicle, etc.). In a specific example, Block S120 can include prompting, at an application executing on the mobile device, the user to input vehicle information (e.g., vehicle model information; number of seats in the vehicle; size of vehicle; driver seat door location; passenger seat door locations; etc.), user information (e.g., devices present and/or otherwise associated with the vehicle; access to a contact list associated with the user, where the contact list can be cross-referenced with device information of other devices residing in the vehicle; demographic information; behavioral data, etc.), and/or any other suitable information.

Relating to Block S120, supplementary data is preferably associated with a temporal indicator that is the same and/or overlapping with a temporal indicator associated with movement data. For example, the method 100 can include collecting movement datasets at a plurality of mobile devices during a time period, and collecting supplementary datasets at the plurality of mobile devices during the time period or an overlapping time period. Additionally or alternatively, the supplementary data can be associated with a temporal indicator distinct from temporal indicators associated with movement data, but can otherwise be associated with any suitable temporal indicator or be time independent. Block S120 can be performed with any suitable temporal relation to other portions of the method 100. In an example, collecting supplementary datasets can be performed prior to determining device association conditions (e.g., where the supplementary data can be used in determining satisfaction or failure of the device association conditions, etc.); and ceased in response to determining the device association conditions (e.g., where supplementary data can be excluded from the determination of vehicle movement characteristics). In another example, collecting supplementary datasets can be performed in response to determining a device association condition. However, collecting supplementary datasets S120 can be performed at any suitable time and frequency. Any characteristics described in relation to movement datasets (e.g., in Block S110, Block S115, etc.) can additionally or alternatively apply to supplementary datasets, and Block S120 can be performed in any suitable manner.

3.4 Processing Datasets.

Block S125 recites: processing at least one of a movement dataset and a supplementary dataset. Block S125 functions to process data collected at least in one of Blocks S110, S115, and S120 into a form suitable for determining device association conditions, vehicle movement characteristics, and/or any other suitable data. Processing datasets (e.g., in Block S125 and/or any other suitable portion of the method 100) can include any one or more of: extracting features (e.g., from a plurality of datasets collected at a plurality of mobile devices, etc.), performing pattern recognition on data (e.g., comparing current movement datasets to reference movement datasets), fusing data from multiple sources, combination of values (e.g., averaging values, etc.), compression, conversion (e.g., digital-to-analog conversion, analog-to-digital conversion), performing statistical estimation on data (e.g. ordinary least squares regression, non-negative least squares regression, principal components analysis, ridge regression, etc.), wave modulation, normalization, updating, ranking, weighting, validating, filtering (e.g., for baseline correction, data cropping, etc.), noise reduction, smoothing, filling (e.g., gap filling), aligning, model fitting, binning, windowing, clipping, transformations, mathematical operations (e.g., derivatives, moving averages, summing, subtracting, multiplying, dividing, etc.), multiplexing, demultiplexing, interpolating, extrapolating, clustering, image processing techniques (e.g., image filtering, image transformations, histograms, structural analysis, shape analysis, object tracking, motion analysis, feature detection, object detection, stitching, thresholding, image adjustments, etc.), other signal processing operations, other image processing operations, visualizing, and/or any other suitable processing operations. In an example, Block S125 can include associating different data (e.g., different data collected at different mobile devices, different data types, same data type, etc.) based on a common and/or overlapping temporal indicator (e.g., time point, time window, time period, etc.), which can enable data collected from multiple sources during a common temporal indicator to be processed and/or analyzed together.

Block S125 preferably includes extracting one or more movement features from at least one of a movement dataset and a supplementary dataset, but movement features can be derived from any suitable data. Movement features are preferably associated with at least one of a position, a velocity, and an acceleration characterizing the movement of the vehicle during a time period. Movement features can include any one or more of: raw movement data (e.g., raw location data, raw motion data, etc.), processed movement data (e.g., through a processing operation described above), movement profiles (e.g., driving profile, braking profile, position profile, speed profile, acceleration profile, turning profile, etc.), identified driving actions (e.g., parking, acceleration, braking, short following, lane-departure, freewheeling, U-turn, left turn, right turn, over-revving, stationary vehicle, moving vehicle, etc.), vehicle motion characteristics (e.g., determined in Block S142), and/or any other suitable features. Movement features can be extracted from datasets collected at a plurality of devices, from a dataset collected at a single device, and/or from any other suitable combination of components. For example, the method 100 can include identifying driving actions based on PVA data aggregated and combined from a plurality of smartphones residing in the vehicle. However, movement features can be configured in any suitable manner.

Additionally or alternatively, Block S125 can include extracting one or more supplementary features (e.g., device association features indicative of device associations, user features, weather features, traffic features, etc.), from one or more supplementary datasets (e.g., logs of communications between user devices, a weather dataset, a traffic dataset). For example, the method 100 can include collecting, from a first mobile device, a log of communications; generating an analysis of the log of communications to identify associated contacts (e.g., parsing the log of communications to identify phone numbers, etc.); and determining device association conditions based on the analysis (e.g., mapping the identified phone numbers to user accounts stored at the vehicle movement determination system; determining if a device associated with the user accounts is currently participating in a driving session; etc.). In another example, the method 100 can include deriving a mobile device location feature within the vehicle (e.g., in pocket, on a seat, on dashboard, on a car mount mobile device holder, held in a hand, etc.) from processing mobile device light sensor data, camera data (e.g., image recognition processing operations on in-vehicle camera data) and/or other suitable data. However, extracting supplementary features can be performed in any suitable manner.

In variations, Block S125 and/or other suitable portions of the method 100 can include applying one or more computer-implemented rules (e.g., feature engineering rules; user preference rules; data collection and/or processing rules; etc.) in processing data, which can confer improvements in accuracy (e.g., by processing datasets from a plurality of mobile devices residing in the same vehicle), processing speed (e.g., through inventive distributions of functionality across networks of mobile devices and a vehicle movement determination system, etc.), data storage and retrieval (e.g., for facilitating multi-device-based analysis leveraging data from a plurality of mobile devices associated with the vehicle, such as compared to single-device-based analysis; etc.), and/or in any other suitable aspects associated with the method 100 and/or system 200. In examples, applying a feature engineering rule can include applying a feature selection rule (e.g., feature selection algorithms such as exhaustive, best first, simulated annealing, greedy forward, greedy backward, and/or other suitable feature selection algorithms) to filter, rank, and/or otherwise select features for use in generating, executing, updating, and/or otherwise processing one or more computational models described herein (e.g., device association condition models; vehicle movement models; user-related action models; etc.). In an example, the method 100 can include obtaining a set of computer-implemented rules defining the vehicle movement characteristic as a function of movement feature types associated with at least one of position, velocity, and acceleration; extracting a set of movement features from a plurality of movement datasets (e.g., a first and a second movement dataset respectively corresponding to a first and a second mobile device), where the set of movement features correspond to the movement feature types; and determining a vehicle movement characteristic based on the set of movement features and the set of computer-implemented rules. Choice of feature selection rules can be based on devices (e.g., number, type, and/or other aspects of mobile devices residing in the vehicle, etc.), users (e.g., number, type, and/or other aspects of users residing in the vehicle, etc.), vehicle (e.g., type of vehicle, etc.), other movement data, other supplementary data, and/or any other suitable data. However, applying computer-implemented rules can be performed in any suitable manner.

In variations, Block S125 and/or other suitable portions of the method 100 can include filtering data from at least one of a movement dataset and a supplementary dataset. Movement and supplementary data can be filtered using both independent filters (e.g., filters operating on data from a single source) and joint filters (e.g., filters operating on data from multiple sources). In an example, data collected from a first device can be filtered and/or otherwise modified based on data collected at a second device. In a specific example, PVA data associated with the same time period but inconsistent across mobile devices (e.g., where a mobile device of the plurality is being handled by a user, thereby biasing the movement data, etc.) can be weighted less heavily in determining vehicle movement characteristics (e.g., a driver score, etc.). In another specific example, the method 100 can include collecting movement datasets from a first, second, and third mobile device; and filtering movement data outliers from movement data collected at the first mobile device based on inconsistency with movement data collected at the second and the third mobile devices. In another example, data of a first data type can be filtered and/or otherwise modified based on data of a second data type. In a specific example, location data can be filtered based on motion data (e.g., if GPS data indicates a sudden change in velocity, but that change in velocity is not reflected in accelerometer readings, the GPS data can be flagged as untrustworthy data, etc.), and/or vice versa.

Block S125 is preferably performed at a vehicle movement determination system (e.g., remote computing system, etc.), but can additionally or alternatively be performed at mobile devices and/or at any suitable components at any suitable time and frequency (e.g., in response to collecting a threshold amount and/or threshold types of data, etc.). However, processing at least one of a movement dataset and a supplementary dataset can be performed in any suitable manner.

3.5 Determining a Device Association Condition.

Block S130 recites: determining a device association condition based on the first and the second movement datasets, which can function to detect, calculate, and/or otherwise determine satisfaction and/or failure of one or more device association conditions. Device association conditions are preferably indicative of a plurality of devices associated with a vehicle (e.g., residing within the same vehicle, etc.), each other (e.g., devices physically proximal each other; devices currently and/or historically in communication with each other; etc.), users (e.g., mobile devices associated with user accounts; mobile devices associated with the driver and/or passenger; etc.), and/or any other suitable entities. Block S130 can include detecting a driving session (e.g., vehicular travel) associated with at least one mobile device of a plurality (e.g., a smartphone residing in a vehicle participating in a driving session, etc.), and detecting and/or otherwise inferring presence of other mobile devices in the same vehicle. Additionally or alternatively, device association conditions can indicate any suitable information regarding any suitable components (e.g., movement features, supplementary features, etc.). For example, Block S130 can include analyzing audio data from a mobile device microphone to both detect a driving session associated with the mobile device and to identify the vehicle type based on the engine noise of the vehicle.

Device association conditions can include one or more of: device association scores (e.g., same vehicle scores indicative of the probability of a plurality of mobile devices residing in the same vehicle; scores indicating a degree of association between two or more devices, such as between two or more smartphones, between a smartphone and a vehicle; etc.), binary conditions (e.g., whether or not a plurality of mobile devices are residing in the same vehicle; whether or not a plurality of devices are associated; etc.), trigger conditions (e.g., where device association conditions can act as trigger conditions for other portions of the method 100 and/or for any other suitable actions; etc.), and/or any other suitable conditions. In an example, Block S130 can include calculating a same vehicle score for a first and a second mobile device; and comparing the same vehicle score to a same vehicle score threshold (and/or other same vehicle score condition) indicative of the first and the second mobile devices residing in the first vehicle (e.g., where other portions of the method 100, such as determining vehicle movement characteristics, can be performed in response to the same vehicle score exceeding the threshold, etc.).

In a variation, Block S130 can include determining satisfaction of a device association condition (e.g., where datasets and/or features satisfy the criteria defined by the device association condition), which preferably indicates the presence of a plurality of mobile devices in the vehicle, but can additionally or alternatively indicate any other suitable information. In another variation, Block S130 can include determining failure of a device association condition (e.g., which can indicate that two or more mobile devices of the plurality are not residing in the same vehicle). In an example, the method 100 can include: collecting a first and a second initial movement dataset (e.g., corresponding to a first and a second mobile device) associated with an initial time period; determining satisfaction of a device association condition based on the first and second initial movement datasets (e.g., which can trigger determination of vehicle movement characteristics; etc.); collecting a first and a second subsequent movement dataset (e.g., corresponding to the first and second mobile devices, etc.) associated with a subsequent time period; determining failure of the device association condition based on the first and the second subsequent movement datasets (e.g., a second user associated with the second mobile device leaves the vehicle); collecting a third subsequent movement dataset (e.g., associated with the subsequent time period, associated with a different time period) corresponding to a third mobile device; and determining satisfaction of a second device association condition for the second and third mobile devices based on the third subsequent movement dataset (e.g., and a movement dataset associated with the second mobile device, such as the second subsequent movement dataset; where the second device association condition can be indicative of the second user entering a second vehicle in which the third mobile device resides; etc.). In another example, determining failure of device association conditions can be performed after determining success of the device association conditions (e.g., where a first and second mobile device were residing in the same vehicle, and are currently no longer residing in the same vehicle, etc.), prior to any determination of success of device association conditions (e.g., where datasets and/or features indicated a potential of a plurality of mobile devices residing in the same vehicle, but further analysis indicated otherwise, etc.), and/or in any suitable temporal relation to other instances of determining device association conditions. However, detecting satisfaction and/or failure of device association conditions can be performed in any suitable manner.

Relating to Block S130, determining device association conditions is preferably based on movement datasets (e.g., movement features extracted from movement datasets; motion datasets; location datasets; etc.). In an example, Block S130 can include comparing a first movement dataset associated with a first mobile device to a second movement dataset associated with a second mobile device (e.g., to determine similarity or difference in PVA across the movement datasets; detecting satisfaction of device association conditions based on whether the first and additional mobile devices are near in position, traveling at similar speeds, experiencing similar accelerations; etc.), but comparisons between any number of movement datasets associated with any number of mobile devices can be performed. In a specific example, Block S130 can include detecting a mobile device as associated with a driving session based on detecting that a one or more mobile devices are traveling within particular speed ranges (e.g., a smartphone is traveling at speeds associated with a car, such as between 10 and 120 MPH). In another specific example, Block S130 can include detecting that one or more mobile devices are following a travel route consistent with roads and/or other vehicles (e.g., GPS position data that indicates that a mobile device is currently traveling substantially along a highway route, etc.). In another example, Block S130 can include detecting PVA data associated with vehicles (e.g., performing pattern matching approaches, such as with a device association condition model, etc.), such as a particular acceleration profile (e.g., acceleration data over time for can differ from acceleration profiles associated with non-vehicular-associated movement of mobile devices, such as when running or dropping the mobile device; etc.). In another example, Block S130 can include comparing a movement dataset associated with one or more mobile devices to movement datasets associated with one or more vehicles (e.g., a current movement dataset of a vehicle in which a mobile device can be residing in; historical movement datasets of vehicles used as a reference for determining if mobile device-derived movement datasets are similar; etc.). Additionally or alternatively, determining device association conditions based on movement data can be performed in any suitable manner. However, determining device association conditions can be based on any suitable data.

In a variation, Block S130 can include determining device association conditions based on location proximity (e.g., between mobile devices; between mobile devices and other devices, such as the vehicle; etc.). Location proximity can include proximity scores, binary evaluators (e.g., either detecting an indicator of proximity or not), and/or any other suitable location-related characteristics. In an example, Block S130 can include determining (e.g., at a remote vehicle movement determination system, etc.) a mobile device location proximity between the first and the second mobile devices based on the first and the second location sensors; and detecting the satisfaction of the device association condition based on the mobile device location proximity (e.g., if the distance between the mobile devices is below a threshold distance, such as an average length of an automobile; etc.). In another example, Block S130 can include determining a vehicle location based on a vehicle sensor (e.g., a vehicle navigation system); determining a proximity between the vehicle and a mobile device based on the vehicle location (e.g., and location data from a location sensor of the mobile device), and determining the device association condition based on the proximity (e.g., falling below a distance threshold). In another example, Block S130 can include determining proximity values between devices over time (e.g., where device association conditions can be based on the changes in proximity between devices over time, etc.). In another example, Block S130 can include determining proximity between devices without explicitly calculating position. In a specific example, Block S130 can include analyzing signal strengths of wireless transmissions (e.g., cellular, Wi-Fi, Bluetooth) between devices (e.g., between smartphones, between smartphones and cellular towers; between smartphones and vehicles; etc.), where the signal strengths can be used to estimate proximity between devices. In examples, Block S130 can include determining location proximity based on optical data (e.g., performing object recognition identifying a vehicle based on optical data from a mobile device within the vehicle, such as through using image recognition model trained on images of vehicle interiors; identifying a proximal smartphone using a camera of the first smartphone), audio data (e.g., detecting an audio beacon of an additional smartphone at the microphone of a first smartphone), and/or any other suitable types of data. However, determining device association conditions based on location proximity can be performed in any suitable manner.

In another variation, Block S130 can include determining device association conditions based on historical datasets (e.g., for historical driving sessions associated with mobile devices corresponding to a current driving session; for historical driving sessions associated with different mobile devices associated with different users, which can be used for generating a device association condition model; etc.). In an example, Block S130 can include receiving a first historical movement dataset corresponding to at least one of the first location sensor and the first motion sensor of the first mobile device, where the first historical movement dataset is associated with a historical time period corresponding to a historical driving session (e.g., with at least one of the first and the second mobile devices residing in the first vehicle); receiving a second historical movement dataset corresponding to the at least one of the second location sensor and the second motion sensor of the second mobile device, where the second historical movement dataset is associated with the historical time period; and determining a first device association condition based on the first and the second historical movement datasets, and a first and a second current movement datasets. In another example, determining device association conditions can be based on a previously-known association between any suitable devices and/or entities. Previously known associations can be based on suitable historical datasets indicating that the additional mobile devices are likely to be in the same vehicle. In a specific example, the previously known association can be based on historical data related to driving sessions (e.g., there is data indicating that the first and additional mobile devices travel in the same vehicle frequently; that the mobile devices frequently travel together from a current origin or to a current destination of the driving session; etc.). In another specific example, the previously known association can be specified (e.g., a service or platform linked to the mobile devices can indicate that the mobile devices are associated, such as belonging to members of the same family, or workers that carpool together, etc.). However, determining device association conditions based on historical datasets can be performed in any suitable manner.

In another variation, Block S130 can include determining device association conditions based on a shared environment (e.g., similar signal characteristics, visual characteristics, audio characteristics, electromagnetic characteristics, etc.). For example, device association conditions can be based on a shared communication network (e.g., current network; historic network; wired communication; wireless communication, such as wireless signals associated with the mobile devices; etc.). In a specific example, the method 100 can include detecting a first wireless signal between a first mobile device and a wireless communication system (e.g., a WiFi hot spot associated with the vehicle; the vehicle itself; Bluetooth pairing; etc.); detecting a second wireless signal between a second mobile device and the wireless communication system; and determining the device association condition based on the wireless signals (e.g., the mobile devices seeing the same WiFi access points, such as via MAC address or SSID; the mobile devices within a threshold range of a WiFi access point; etc.) and/or other suitable data. In another specific example, mobile devices that have associated with (e.g., paired with; connected to; communicated with; authenticated with; currently and/or historically; etc.) a vehicle can be a factor that increases a same vehicle score and/or otherwise influences device association conditions. In another example, Block S130 can include collecting audio data from the plurality of mobile devices indicating a shared sampling of engine noise during a same time period (e.g., indicating satisfaction of a device association condition; etc.). In another example, Block S130 can be based on communicating with an external system (e.g., a car's computer communicates to a mobile device that it is connected to a moving vehicle; etc.). However, determining device association conditions based on shared environments can be performed in any suitable manner.

In another variation, Block S130 can include determining device association conditions can be based on user data. For example, users can indicate associations between devices (e.g., at an application executing on a device; in response to a digital survey; through inputting user account handles, contact information, device information, and/or other identifying information for associated users; etc.). In another example, Block S130 can be based on a user's implicit indication (e.g., the user requests driving directions and/or other navigation; performs a driving-related device event action, such as opening and/or otherwise using driving-related applications; etc.) or a user's explicit indication (e.g., the user indicates that he or she is traveling in a vehicle). In another variation, Block S130 can include processing a plurality of datasets described herein (e.g., different movement datasets from different mobile devices; movement datasets and supplementary datasets; etc.) to determine device association conditions. However, Block S130 can be based on any suitable data in any suitable manner.

Portions of Block S130 can be performed in parallel (e.g., determining device association conditions for a plurality of mobile devices in parallel; etc.), in serial (e.g., determining that a first mobile device is associated with a driving session, and in response to that determination, determining that a second mobile device is associated with the driving session; etc.), and/or at any suitable time and frequency (e.g., with any temporal relation to trigger conditions and/or other suitable portions of the method 100, such as pre-, during, and/or post-driving sessions, etc.). In an example, a determined device association condition (e.g., for a first mobile device) can be used as a filtering factor, weighting factor, and/or other suitable factor in determining additional device association conditions (e.g., for a second or other additional mobile device; for subsequent determinations of device association conditions associated with the same mobile device). In a specific example, the method 100 can include analyzing movement data for mobile devices for which an same vehicle score exceeds a threshold, and/or for mobile devices that are explicitly associated (e.g., a family association, a carpool association, a manually inputted association, etc.) In another specific example, Block S130 can include monitoring for other mobile devices associated with a driving session in response to determining that a first mobile device is associated with the driving session.

In a variation related to Block S130, the method 100 can include performing an action (e.g., a portion of the method 100, such as data collection and/or vehicle movement characteristic determination, etc.) after (e.g., in response to, etc.) determining the device association condition (e.g., the satisfaction of the condition, etc.). For example, the method 100 can include ceasing data collection for one or mobile devices in response to determining the device association condition. In a specific example, the method 100 can include ceasing collection of movement datasets corresponding to the at least one of a location sensor and a second motion sensor of a mobile device (e.g., residing in the vehicle) in response to determining a device association condition. In specific examples, ceasing data collection can be based on device association conditions and/or device characteristics (e.g., battery characteristics; types of data collectable by the mobile device; permissions associated with the mobile device; etc.). In another example, cooperative data capture with a plurality of mobile devices can be performed after determination of the device association condition (e.g., which can leverage the availability of multiple sources of data capture to increase efficiency associated with the data capture; etc.) In a specific example, the method 100 can include reducing the cost of data capture (e.g., the presence of multiple smartphones in a car can improve the performance of dead-reckoning, reducing the need for collection of specific data types, in turn reducing overall battery usage, etc.), sharing the load of data capture (e.g., spreading GPS data collection across a set of mobile devices to avoid draining the battery of any individual smartphone, etc.), and/or increasing the accuracy of data capture (e.g., using smartphone data from multiple smartphones to isolate vehicle motion from individual phone motion as detected via accelerometer). In another example, the method 100 can include managing smartphone data capture (e.g., managing sensor operation of sensors of the mobile devices, controlling data transmission of the smartphones, and/or providing feedback to the smartphones, etc.). In a specific example, the method 100 can include setting the operating states of one or more smartphone sensors. Sensor operating states can dictate how data is collected, including data collection frequency, sensor power state, and/or other suitable parameters. Managing sensor operating states can based on any suitable criteria, including one or more of: the battery state (e.g., charge level, charging status) of the mobile device including the sensor or of the other multiple mobile devices, time of day, location, route knowledge (e.g., how much data has been collected about the current route and/or position), sensor quality (e.g., GPS signal quality), capabilities of the mobile device including the sensor or of the other multiple mobile devices, other movement data, other supplementary data, and/or any other data. In another specific example, the method 100 can include managing data transmission of the mobile devices (e.g., determining which data should be transmitted by the smartphones to each other or to the vehicle movement determination system, etc.). Data transmission can also be managed based on data transmission criteria (e.g., one smartphone can have more limited bandwidth or a more expensive cellular internet plan than others) and/or any other suitable data described herein.

Relating to Block S130, determining device association conditions can be performed in any manner described in and/or analogous to U.S. application Ser. No. 15/584,375 filed 2 May 2017 (e.g., such as in relation to performing threshold satisfaction tests, etc.), which is herein incorporated in its entirety by this reference. However, determining device association conditions can be performed in any suitable manner.

3.6 Determining a Vehicle Movement Characteristic.

Block S140 recites: determining a vehicle movement characteristic based on the first and the second subsequent movement datasets, which can function to determine characteristics describing one or more of: vehicles (e.g., PVA-related characteristics; type of vehicle, such as including autonomous properties; etc.), users (e.g., classifications of passenger or driver; driver behavior; passenger behavior; etc.), and/or any other suitable entities. Determining the vehicle movement characteristic can include any one or more of: combining datasets (e.g., processing a plurality of movement datasets associated with a plurality of mobile devices to extract a set of movement features to input into a vehicle movement model; etc.), and/or otherwise processing datasets (e.g., using processing techniques described herein, such as in relation to Block S125, etc.) to improve accuracy and/or other suitable aspects associated with vehicle movement characteristic (e.g., processing speed, storage and/or retrieval associated with the vehicle movement characteristic, etc.).

Regarding Block S140, the vehicle movement characteristic preferably includes at least one of a position characteristic, a velocity characteristic, and an acceleration characteristic for the vehicle, but can additionally or alternatively include any one or more of: driver characteristics (e.g., driver scores, which can include fuel efficiency scores, emissions scores, risk scores such as in relation to vehicular accident, scores related to risks associated with autonomous vehicles, etc.), vehicular accident events, driver and/or passenger classifications, navigation parameters (e.g., for facilitating display of location, provision of directions, etc.), insurance-related characteristics, and/or any other suitable characteristics related to vehicle movement. For example, Block S140 can include determining a driver score based on movement datasets (and/or other suitable data), where the driver score describes driving ability of the driver of the vehicle; and associating the driver score with a user account identifying the driver based on a classification of the first mobile device as associated with the driver (e.g., based on movement datasets and/or supplementary datasets, such as the same datasets used in determining a device association condition; etc.). In another example, the method 100 can include determining a classification of the first mobile device as associated with a driver (or passenger) of the vehicle based on movement datasets; and determining the vehicle movement characteristic based on the classification and/or other suitable data (e.g., weighting movement datasets associated with the driver mobile device more heavily, etc.).

Figure 5:
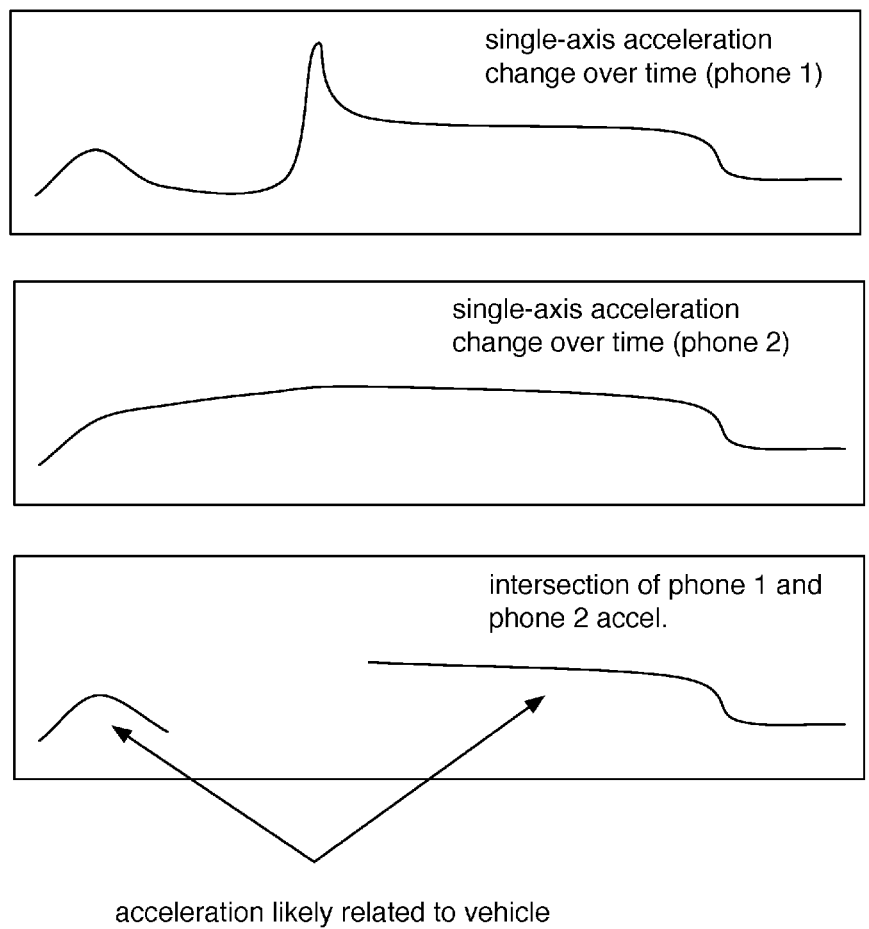
FIG. 5 is a specific example representation of acceleration profiles in a variation of an embodiment of a method for improving movement characteristic determination.

Relating to Block S140, determining vehicle movement characteristics is preferably based on movement datasets associated with a plurality of mobile devices. For example, PVA data (e.g., GPS position, etc.) associated with the different movement datasets can be averaged, filtered, smoothed, filled, and/or otherwise combined and/or processed for improving aspects (e.g., accuracy, personalization, processing speed, etc.) associated with a vehicle movement characteristic. In another example, Block S140 can include weighting different datasets. In a specific example, the method 100 can include determining a first weight associated with a first movement dataset (e.g., a weight for each value of the movement dataset, a weight for portion of values of the movement dataset, etc.) based on a first device characteristic (e.g., a mobile device type of the first mobile device, such as smartphone versus tablet, type of smartphone, type of sensors associated with the mobile device, types of data collectable from the mobile device, etc.) of the first mobile device; determining a second weight associated with a second movement dataset based on a second device characteristic of the second mobile device; and combining the first and the second movement datasets based on the first and the second weights (e.g., weighted average). In another example, Block S140 can include determining the intersection of datasets (e.g., PVA data of movement datasets, etc.). In a specific example, for accelerometer data, the intersection can include changes in acceleration experienced by each of the plurality of smartphones (e.g., as shown in FIG. 5, etc.). The intersection data can include data of improved accuracy. Alternatively, the difference between datasets can be used for determining vehicle movement characteristics (e.g., based on identification of motion of mobile devices relative to each other, etc.). In a specific example, with three or more data sources, Block S140 can include determining motion relative to the vehicle (e.g., one pair of data sources, the first and second sources, identifies vehicle motion while the other two pairs identify motion of the third data source relative to vehicle motion). In another example, a plurality of datasets associated with a plurality of mobile devices can be used in determining vehicular accident events in an additional, alternative, and/or analogous manner to that described in U.S. application Ser. No. 15/584,375 filed 2 May 2017. However, determining vehicle movement characteristics based on movement datasets can be performed in any suitable manner.

In another variation, Block S140 can include determining vehicle movement characteristics based on supplementary datasets. In examples, both movement datasets and supplementary datasets (e.g., movement features and supplementary features, etc.) can be used. In a specific example, a movement dataset collected at a first mobile device (e.g., PVA data, etc.) can be processed with a supplementary dataset (e.g., a traffic dataset) collected at a second device to determine a vehicle motion characteristic (e.g., navigation guidance to avoid an upcoming vehicular accident event, etc.). In another specific example, the method 100 can include processing a plurality of movement datasets collected at a plurality of mobile devices (e.g., extracting movement features); processing a plurality of supplementary datasets collected at the plurality of mobile devices (e.g., supplementary features, such as optical features extracted from computer vision techniques and associated with the environment surrounding the vehicle, such as audio features extracted from microphone data of the plurality of mobile devices and associated with vehicle movement; etc.); and determining vehicle movement characteristics based on the processed datasets. However, determining vehicle movement characteristics based on supplementary datasets can be performed in any suitable manner.

In another variation, Block S140 can include determining vehicle movement characteristics based on different types of data (e.g., collected at different mobile devices of the plurality). In an example, the method 100 can include collecting a location dataset corresponding to the location sensor of the first mobile device; collecting a motion dataset corresponding to the motion sensor of the second mobile device; and determining the vehicle movement characteristic based on the location dataset and the motion dataset. In another example, it can be desired to track both accelerometer data and GPS data to perform dead reckoning. In a specific example, the method 100 can include determining an initial location using GPS location data of a first mobile device; and tracking position changes via dead reckoning using accelerometer data collected at a second mobile device (e.g., where a first mobile device is associated with improved GPS location data collection relative a second mobile device; and the second mobile device is associated with improved accelerometer data collection relative the first mobile device). However, determining vehicle movement characteristics based on different data types can be performed in any suitable manner.

In another variation, Block S140 can be based on data collected by different devices at different time periods (e.g., for appending data, filling gaps, etc.). For example, the method 100 can include collecting a first movement dataset during a first portion of a time period (e.g., a first half of the time period, etc.); collecting a second movement dataset during a second potion of the time period (e.g., a second half of the time period, etc.); and determining the vehicle movement characteristic based on a combination of the first and the second movement datasets (e.g., fusing the movement datasets, where the vehicle movement characteristic can describe vehicle movement during the entirety of the time period, etc.). In another example, Block S140 can be based on datasets collected over multiple temporal indicators (e.g., over multiple time periods, such as movement datasets collected prior to device association condition determination, and subsequent movement datasets collected subsequent to device association condition determination). In a specific example, Block S140 can include determining the vehicle movement characteristic based on first and the second initial movement datasets (e.g., associated with a first time period, etc.), and first and second subsequent movement datasets (e.g., associated with a second time period, etc.). In another example, Block S130 can include interleaving and/or otherwise multiplexing data from a plurality of mobile devices. In a specific example, the method 100 can include alternating between updating a location of the vehicle with GPS data from a first smartphone and GPS data from a second smartphone. However, determining vehicle movement characteristics based on data associated with different time periods can be performed in any suitable manner.

In variations, Block S140 can include determining vehicle movement characteristics using a vehicle movement model (e.g., leveraging movement features and/or supplementary features, etc.). Vehicle movement models (and/or other suitable models) can include one or more: probabilistic properties, heuristic properties, deterministic properties, properties described in relation to Block S140 and/or other portions of the method 100, and/or any other suitable properties. Models described herein can employ one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable form of machine learning algorithm. In a specific example, Block S140 can include: collecting optical data from a plurality of mobile devices (e.g., first image data from a first camera of a first smartphone; second image data from a second camera of a second smartphone; etc.); applying a neural network model (e.g., convolutional neural network model, etc.) with neural layer inputs extracted from the optical data (e.g., pixel values of the images from first the first camera and from the second camera; etc.); and determining vehicle movement characteristics based on the outputs of the neural network model (e.g., where the neural network model can be trained upon training set image data associated with different vehicle movement characteristics. In another example, Block S140 can include applying an ensemble learning approach, which can include determining a first vehicle movement characteristic (e.g., a first PVA characteristic; etc.) associated with a first mobile device by using a vehicle movement model, determining a second vehicle movement characteristic (e.g., a second PVA characteristic; etc.) associated with a second mobile device by using the same or different vehicle movement model (e.g., using different vehicle movement models for different sets of data types collected from the different types of mobile devices, such as using a first vehicle movement model for the first mobile device configured to collect both motion data and GPS location data; using a second vehicle movement model fro the second mobile device configured to collect only motion data; etc.); and determining an overall vehicle movement characteristic (e.g., overall PVA characteristic; average PVA characteristic; weighted PVA characteristic; etc.) based on the first and the second vehicle movement characteristics, such as through processing the individual movement characteristics with an additional model (e.g., an additional machine learning model using supplementary features along with the first and the second PVA characteristics; a non-machine learning model; etc.). In a specific example, the method 100 can include collecting sets of historical movement datasets associated with driving sessions involving data collection from a plurality of mobile devices for the particular driving session; associating the movement datasets with vehicle movement characteristics (e.g., labels) to generate a training dataset; and training a machine learning vehicle movement model based on the training dataset. In another specific example, Block S140 can include mapping out a decision tree with decision nodes, chance nodes, and/or end nodes describing actions (e.g., selecting a model to retrieve, collecting additional data, etc.) to take in response to different events (e.g., satisfaction or failure of device association conditions; etc.).

Different models (e.g., generated with different algorithms, with different sets of features, with different input and/or output types, etc.) can be used (e.g., determined; selected, stored, retrieved, executed, updated, etc.) based on any one or more of the types of data associated with the method 100 (e.g., multi-device-based models for use with datasets derived from multiple devices; single-device-based models; etc.), which can confer improvements to the system 200 by improving accuracy (e.g., by tailoring analyses to particular driving sessions involving a particular set of mobile devices, to particular vehicles, users, and/or other entities, etc.), retrieval speed for the appropriate model from a database, training and/or execution of models (e.g., using feature-engineering computer implemented rules, etc.), and/or other suitable aspects of the system 200. In an example, the method 100 can include selecting the multi-device-based vehicle movement model from a set of stored vehicle movement models including the multi-device-based vehicle movement model and a single-device-based vehicle movement model, based on detecting the satisfaction of the device association condition; and determining the vehicle movement characteristic based on the multi-device-based vehicle movement model (e.g., with movement dataset inputs, etc.). However, any suitable number and/or type of models can be used in any suitable manner.

Additionally or alternatively, Block S140 and/or other suitable portions of the method 100 can be analogous to U.S. application Ser. No. 15/652,558 filed 18 Jul. 2017, and U.S. application Ser. No. 15/401,761 filed 9 Jan. 2017, each of which are herein incorporated in their entireties by this reference. However, determining vehicle movement characteristics can be performed in any suitable manner.

3.7 Initiating a User-Related Action.

The method 100 can additionally or alternatively include Block S150, which recites: initiating a user-related action based on the one or more user characteristics. Block S150 can function to determine, promote, provide, and/or otherwise initiate a user-related action for responding to determination of one or more user characteristics. User-related actions can include any one or more of: user-related notifications (e.g., including vehicle movement characteristics such as driver scores, as shown in FIG. 3, etc.), accident response actions, insurance processing, dataset processing (e.g., storing datasets based on user characteristics, such as storing movement datasets for a driving session in association with a user account identifying the user classified as a driver for the driving session, where such processing can confer improvements in data storage and/or data retrieval, such as for generating driving behavior profiles upon which a user-related action such as insurance processing can be based; etc.), and/or other suitable types of user-related actions.

Figure 4:
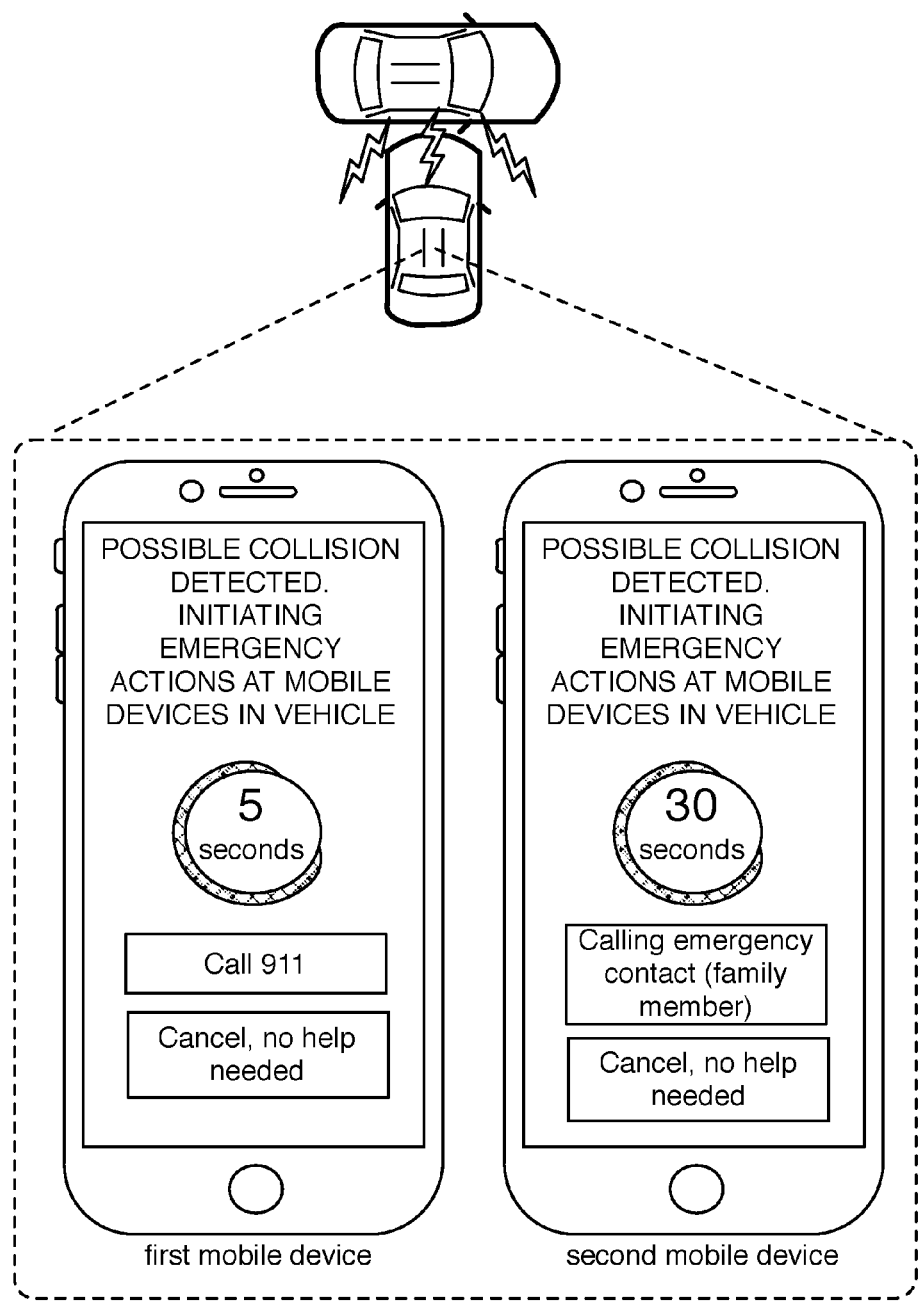
FIG. 4 is a specific example of initiating a user-related action in a variation of an embodiment of a method for improving movement characteristic determination.

In variations, Block S150 can include initiating a plurality of user-related actions (e.g., the same user-related action, different user-related actions, etc.) at a plurality of mobile devices (e.g., residing within the vehicle). In an example, Block S150 can include providing different user-related notifications to different mobile devices associated with the driving session (e.g., a first navigation-related notification provided to the driver mobile device; a second user-related notification provided to a passenger mobile device advising the passenger on how to best guide the driver; etc.). In another example, Block S150 can include initiating a plurality of accident response actions. In a specific example, Block S150 can include determining a vehicular accident event (e.g., based on a vehicle movement model and movement datasets; etc.); in response to detecting the vehicular accident event: automatically initiating a first accident response action at a first mobile device (e.g., automatically initiating a call to emergency services, as shown in FIG. 4, etc.), and automatically initiating a second accident response action at a second mobile device (e.g., automatically initiating a call to an emergency contact, as shown in FIG. 4, etc.). In another example, Block S150 can include facilitating insurance processing at a first mobile device, and initiating an accident response action at a second mobile device in response to determining a vehicular accident event (e.g., with a severity score below a threshold, etc.). Additionally or alternatively, initiating user-related actions can be performed for any suitable number of devices in any manner analogous to U.S. application Ser. No. 15/584,375 filed 2 May 2017, which is herein incorporated in its entirety by this reference. However, any number and type of user-related actions can be provided and/or initiated in any suitable manner at any number of devices.

Although omitted for conciseness, the embodiments include every combination and permutation of the various system components and the various method processes, including any variations, examples, and specific examples, where the method processes can be performed in any suitable order, sequentially or concurrently using any suitable system components.

The system and method and embodiments thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the embodiments without departing from the scope defined in the following claims.

We claim:

1. A method for improving movement characteristic determination using a plurality of mobile devices in a vehicle, the method comprising:
   receiving a first movement dataset corresponding to at least one of a first location sensor and a first motion sensor of a first mobile device of the plurality of mobile devices, wherein the first movement dataset is associated with a first time period;
   receiving a second movement dataset corresponding to at least one of a second location sensor and a second motion sensor of a second mobile device of the plurality of mobile devices, wherein the second movement dataset is associated with the first time period;
   detecting satisfaction of a device association condition indicative of the first and the second mobile devices residing in the vehicle, based on the first and the second movement datasets;
   after detecting the satisfaction of the device association condition:
      receiving a first subsequent movement dataset corresponding to the at least one of the first location sensor and the first motion sensor of the first mobile device, wherein the first subsequent movement dataset is associated with a second time period;
      receiving a second subsequent movement dataset corresponding to the at least one of the second location sensor and the second motion sensor of the second mobile device, wherein the second subsequent movement dataset is associated with the second time period; and
      retrieving a multi-device-based vehicle movement model;
   selecting the multi-device-based vehicle movement model from a set of stored vehicle movement models comprising the multi-device-based vehicle movement model and a single-device-based vehicle movement model, based on detecting the satisfaction of the device association condition; and
   determining a vehicle movement characteristic based on the multi-device-based vehicle movement model and the first and the second subsequent movement datasets, wherein the vehicle movement characteristic is associated with movement of the vehicle.

2. The method of claim 1,
   wherein receiving the first movement dataset comprises receiving, at a remote computing system, a first location dataset corresponding to the first location sensor,
   wherein receiving the second movement dataset comprises receiving, at the remote computing system, a second location dataset corresponding to the second location sensor, and
   wherein detecting the satisfaction of the device association condition comprises:
      determining, at the remote computing system, a mobile device location proximity between the first and the second mobile devices based on the first and the second location sensors; and
      detecting, at the remote computing system, the satisfaction of the device association condition based on the mobile device location proximity.

3. The method of claim 2,
   wherein receiving the first movement dataset comprises receiving, at the remote computing system, a first motion dataset corresponding to the first motion sensor,
   wherein receiving the second movement dataset comprises receiving, at the remote computing system, a second motion dataset corresponding to the second motion sensor, and
   wherein detecting the satisfaction of the device association condition comprises detecting, at the remote computing system, the satisfaction of the device association condition based on the first and the second motion datasets and the mobile device location proximity.

4. The method of claim 1, wherein the vehicle movement characteristic comprises at least one of a position characteristic, a velocity characteristic, and an acceleration characteristic for the vehicle, wherein determining the vehicle movement characteristic comprises determining the at least one of the position characteristic, the velocity characteristic, and the acceleration characteristic based on combining the first and the second subsequent movement datasets for improving accuracy of the vehicle movement characteristic.

5. The method of claim 4, wherein combining the first and the second subsequent movement datasets comprises:
   determining a first weight associated with the first subsequent movement dataset based on a first mobile device type of the first mobile device;
   determining a second weight associated with the second subsequent movement dataset based on a second mobile device type of the second mobile device; and
   combining the first and the second subsequent movement datasets based on the first and the second weights for improving the accuracy of the vehicle movement characteristic.

6. The method of claim 1, further comprising:
   obtaining a set of computer-implemented rules defining the vehicle movement characteristic as a function of movement feature types associated with at least one of position, velocity, and acceleration; and
   extracting a set of movement features from the first and the second subsequent movement datasets, wherein the set of movement features correspond to the movement feature types,
   wherein determining the vehicle movement characteristic comprises determining the vehicle movement characteristic based on the set of movement features and the set of computer-implemented rules.

7. The method of claim 1, wherein the first subsequent movement dataset is collected during a first portion of the second time period from the at least one of the first location sensor and the first motion sensor, wherein the second subsequent movement dataset is collected during a second portion of the second time period from the at least one of the second location sensor and the second motion sensor, and wherein determining the vehicle movement characteristic comprises determining the vehicle movement characteristic describing the movement of the vehicle during the second time period based on a combination of the first and the second subsequent movement datasets.

8. The method of claim 1, further comprising determining a classification of the first mobile device as associated with a driver of the vehicle based on the first and the second movement datasets, wherein determining the vehicle movement characteristic comprises determining the vehicle movement characteristic based on the classification, the vehicle movement model and the first and the second subsequent movement datasets.

9. The method of claim 8, wherein determining the vehicle movement characteristic comprises:
   determining a driver score based on the vehicle movement model and the first and the second subsequent movement datasets, wherein the driver score describes driving ability of the driver of the vehicle; and
associating the driver score with a user account identifying the driver based on the classification of the first mobile device as associated with the driver.

10. The method of claim 1, wherein determining the vehicle movement characteristic comprises determining the vehicle movement characteristic based on the vehicle movement model, the first and the second movement datasets, and the first and the second subsequent movement datasets.

11. A method for improving movement characteristic determination using a plurality of mobile devices associated with a first vehicle, the method comprising:
receiving a first movement dataset corresponding to at least one of a first location sensor and a first motion sensor of a first mobile device of the plurality of mobile devices, wherein the first movement dataset is associated with a time period;
receiving a second movement dataset corresponding to at least one of a second location sensor and a second motion sensor of a second mobile device of the plurality of mobile devices, wherein the second movement dataset is associated with the time period;
determining a first device association condition indicative of the first and the second mobile devices as associated with the first vehicle, based on the first and the second movement datasets;
after determining the first device association condition:
retrieving a vehicle movement model;
detecting a vehicle accident event associated with the time period based on the vehicle movement model and the first and the second movement datasets; and
in response to detecting the vehicle accident event:
automatically initiating a first accident response action at the first mobile device; and
automatically initiating a second accident response action at the second mobile device.

12. The method of claim 11, further comprising:
receiving a first historical movement dataset corresponding to the at least one of the first location sensor and the first motion sensor of the first mobile device, wherein the first historical movement dataset is associated with a historical time period corresponding to a historical driving session with the first and the second mobile devices residing in the first vehicle; and
receiving a second historical movement dataset corresponding to the at least one of the second location sensor and the second motion sensor of the second mobile device, wherein the second historical movement dataset is associated with the historical time period,
wherein determining the first device association condition comprises determining the first device association condition based on the first and the second historical movement datasets, and the first and the second movement datasets.

13. The method of claim 11, further comprising:
receiving a first subsequent movement dataset corresponding to the at least one of the first location sensor and the first motion sensor of the first mobile device, wherein the first subsequent movement dataset is associated with a subsequent time period;
receiving a second subsequent movement dataset corresponding to the at least one of the second location sensor and the second motion sensor of the second mobile device, wherein the second subsequent movement dataset is associated with the subsequent time period; and
detecting failure of the first device association condition based on the first and the second subsequent movement datasets.

14. The method of claim 13, further comprising:
receiving a third subsequent movement dataset corresponding to at least one of a third location sensor and a third motion sensor of a third mobile device, wherein the third subsequent movement dataset is associated with the subsequent time period; and
determining a second device association condition indicative of the second and the third mobile devices as associated with a second vehicle, based on the second and the third subsequent movement datasets.

15. The method of claim 11, wherein the first movement dataset comprises a location dataset corresponding to the first location sensor of the first mobile device, wherein the second movement dataset comprises a motion dataset corresponding to the second motion sensor of the second mobile device, and wherein determining the vehicle movement characteristic comprises determining the vehicle movement characteristic based on the location dataset and the motion dataset.

16. The method of claim 11, wherein determining the first device association condition comprises:
calculating a same vehicle score for the first and the second mobile devices; and
determining the same vehicle score as exceeding a same vehicle score threshold indicative of the first and the second mobile devices residing in the first vehicle.

17. The method of claim 11, further comprising ceasing collection of movement datasets corresponding to the at least one of the second location sensor and the second motion sensor of the second mobile device in response to determining the first device association condition.

18. The method of claim 11, further comprising:
detecting a first wireless signal between the first mobile device and a wireless communication system; and
detecting a second wireless signal between the second mobile device and the wireless communication system,
wherein determining the first device association condition comprises determining the first device association condition based on the first and the second wireless signals and the first and the second movement datasets.

* * * * *